(12) United States Patent
Abe (10) Patent No.: US 6,327,906 B1
(45) Date of Patent: Dec. 11, 2001

(54) ROTARY SENSOR CAPABLE OF HIGH-RELIABILITY DETECTION OF ROTATION ANGLE TRANSMITTED FROM OUTSIDE

(75) Inventor: Hideki Abe, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/384,944

(22) Filed: Aug. 27, 1999

(30) Foreign Application Priority Data

Aug. 31, 1998 (JP) .................................................. 10-245495

(51) Int. Cl.$^7$ ........................................................ G01P 15/00
(52) U.S. Cl. .............................................................. 73/488
(58) Field of Search ......................... 73/488; 324/207.25, 324/207.11; 338/13, 73

(56) References Cited

U.S. PATENT DOCUMENTS 5,201,291    4/1993    Katoh et al. .
5,506,502  * 4/1996    Maennle ..................... 324/207.25
5,567,874   10/1996    Suzuki et al. .
5,571,960   11/1996    Tateishi et al. .

FOREIGN PATENT DOCUMENTS 43 31 902 A1    3/1995    (DE) .
43 31 909 A1    3/1995    (DE) .
44 31 453 A1    3/1996    (DE) .

* cited by examiner

Primary Examiner—Richard A. Moller
(74) Attorney, Agent, or Firm—Brinks Hofer Gilson & Lione (57) ABSTRACT

A rotary sensor having a rotator to which rotation from outside is transmitted, a housing on which the rotator is rotatably supported, and an angle sensing member for detecting the angle of rotation to the rotator. At least two, first and second torsion coil springs which constantly turn the rotator in one direction towards the housing are disposed between the rotator and the housing.

14 Claims, 5 Drawing Sheets

ROTARY SENSOR CAPABLE OF HIGH-RELIABILITY DETECTION OF ROTATION ANGLE TRANSMITTED FROM OUTSIDE

BACKGROUND OF THE INVENTION

1. Field of the Invention

This invention relates to a rotary sensor and more particularly to a rotary sensor capable of detecting rotation angle with high reliability.

2. Description of Related Art

Figure 8:
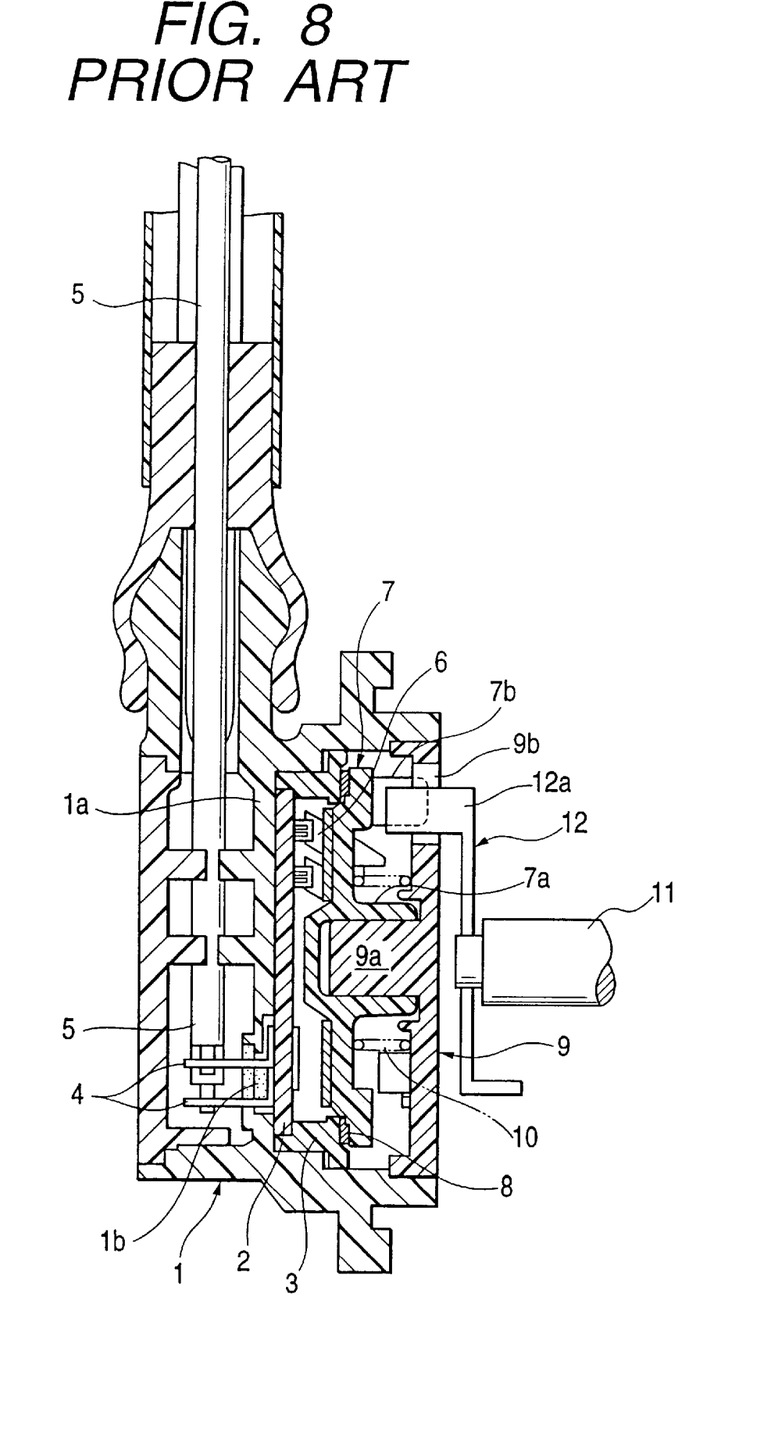
FIG. 8 is a sectional view of a major portion of a prior art rotary sensor.

In a prior art rotary sensor, as shown in FIG. 8, a housing 1 is formed in an approximately cylindrical shape surrounding the outer periphery. In this housing 1 a partition wall 1a is formed.

On the right side surface of the partition wall 1a in the drawing a resistor board 2 is positioned by the use of an annular spacer 3 and fixedly attached to the partition wall 1a.

On one end of the resistor board 2 a terminal 4 is attached. The terminal 4 is projectively formed on the left side of the partition wall 1a in the drawing. A sealant 1b is filled in a gap portion of the partition wall 1a where the terminal 4 is attached, to thereby separate the partition wall 1a to the right and left members in the drawing.

In the vicinity of the forward end of the terminal 4 the end of a lead 4 is soldered. The lead is led out upwardly in the drawing.

On the surface of the resistor board 2 a resistor pattern not depicted is formed by printing. A slider piece 6 which slides in elastic contact with the resistor pattern is attached on a slider holder 7, which is rotatably disposed oppositely to the resistor board 2. Between the outer periphery of the slider holder 7 and the annular spacer 3 there is mounted a thrust washer 8 to reduce frictional resistance.

The slider holder 7 is rotatably mounted with the hollow portion of its boss portion 7a formed on the center of rotation inserted over a stationary shaft 9a of a holder guide 9. On the upper right side surface of the slider holder 7 in the drawing, a lock pawl 7b is formed projecting to the holder guide 9 side.

On the outer periphery side of the boss portion 7a one torsion coil spring 10 is mounted. The torsion coil spring 10 is attached at one end to the slider holder 7 side and at the other end to the holder guide 9 side, so that the slider holder 7 will constantly be pressed to rotate in one direction.

The holder guide 9 is securely attached at the outer peripheral side surface to the inner peripheral surface of the housing 1, and a circular long hole 9b as viewed from the front is formed above the stationary shaft 9a in the drawing, thus schematically constituting the prior art rotary sensor.

The prior art rotary sensor, when used as an accelerator pedal position sensor of an automobile for example, is attached on a predetermined mounting member not depicted. On the right side of the rotary sensor in the drawing, a rotatable drive shaft 11 is disposed and coupled with the automotive accelerator pedal not depicted. On the forward end of the drive shaft 11 an arm member 12 having an approximately L-shaped retaining portion 12a is fixedly mounted.

The forward end of the retaining portion 12a is positioned within the long hole 9b of the holder guide 9, and is constantly in elastic contact with the lock pawl 7b of the slider holder 7 which is pressed to rotate in one direction by the elastic force of the torsion coil spring 10.

When for instance the accelerator pedal is depressed to turn the drive shaft 11 through a specific angle in the other direction, the slider holder 7 is also turned through a specific angle in the other direction against the elastic force of the torsion coil spring 10.

With the rotation of the slider holder 7, the resistance value of an unillustrated resistor on the resistor board 2 varies. This variation in the resistance value is detected by an unillustrated control unit connected to the lead wire 5, thereby enabling detection of the rotation angle of the drive shaft 11.

In the meantime, when the accelerator pedal is released, the drive shaft 11 is restored to the initial state and, with the rotation of the arm member 12, the slider holder 7 is reset to the initial position by the elastic force of the torsion coil spring 10.

In the prior art rotary sensor described above, however, only a single torsion coil spring 10 is employed to elastically force the slider holder 7 towards the direction of rotation. The torsion coil spring 10, therefore, is subjected to accumulated metal fatigue on the slider holder 7 side or in the retaining portion on the holder guide 9 side, resulting in a spring failure during rotation of the slider holder 7 after a use for long-time. In the event of the failure of the torsion coil spring 10, the slider holder 7 can not be restored to the initial position and consequently the automobile will fail to operate.

Also it is necessary to provide a force of restoration of a specific value or more in any position of rotation. Where the torsion coil spring 10 alone is used, it becomes necessary to increase a spring constant, which, however, will make the torsion coil spring 10 liable to break. The problem also arises that the torsion coil spring 10 of the rotary sensor requires an increase in the strength of its mounting portion.

As a measure to solve these problems, the number of coils of the torsion coil spring 10 needs to be increased to lower the rate of increase of the spring force with respect to the amount of rotation. In this case however, the problem arises that the rotary sensor will increase in height.

SUMMARY OF THE INVENTION

To solve the aforementioned problems, therefore, this invention has an object to provide a rotary sensor which can continue to operate without stopping if there occurs such a trouble as the failure of the torsion coil spring 10 during operation, and also can achieve a relatively uniform elastic force of the torsion coil spring 10 at any angle of rotation in the direction of rotation, and an excellent effect of decreasing in thickness.

As the first arrangement to solve the aforesaid problems, the rotary sensor of this invention is comprised of a rotator for transmitting rotation from outside, a housing for rotatably supporting the rotator, and an angle sensing member for detecting the angle of rotation of the rotator; and at least two first and second torsion coil springs constantly applying a spring force to turn the rotator in one direction towards the housing are mounted between the rotator and the housing.

As the second arrangement to solve aforesaid problems, a rotating shaft formed on the center of rotation of the rotator is rotatably supported on the housing; the first torsion coil spring is disposed to surround the rotating shaft; and the second torsion coil spring is disposed outside of the first torsion coil spring to surround the first torsion coil spring.

As the third arrangement to solve the aforesaid problems, the first and second torsion coil springs are made such that the retaining portion formed at one end is retained to a part of the housing and the retaining portion formed on the other end retained to a part of the rotator; the retaining portion on the one end of the second torsion coil spring being superposed on the retaining portion at one end of the first torsion coil spring.

As the fourth arrangement to solve the aforesaid problems, the first and second torsion coil springs are disposed in the first and second guide grooves of a specific depth formed in the housing. The first guide groove is formed deeper by the wire diameter of the first torsion coil spring than the second guide groove. And the depth of the second guide groove is made equal to the depth of the first guide groove in the superposed retaining portions on the one end of the first and second torsion coil springs.

Other features and advantages of this invention will become apparent from the following description of embodiments of this invention, together with the accompanying drawings.

DESCRIPTION OF THE PREFERRED EMBODIMENTS

Figure 1:
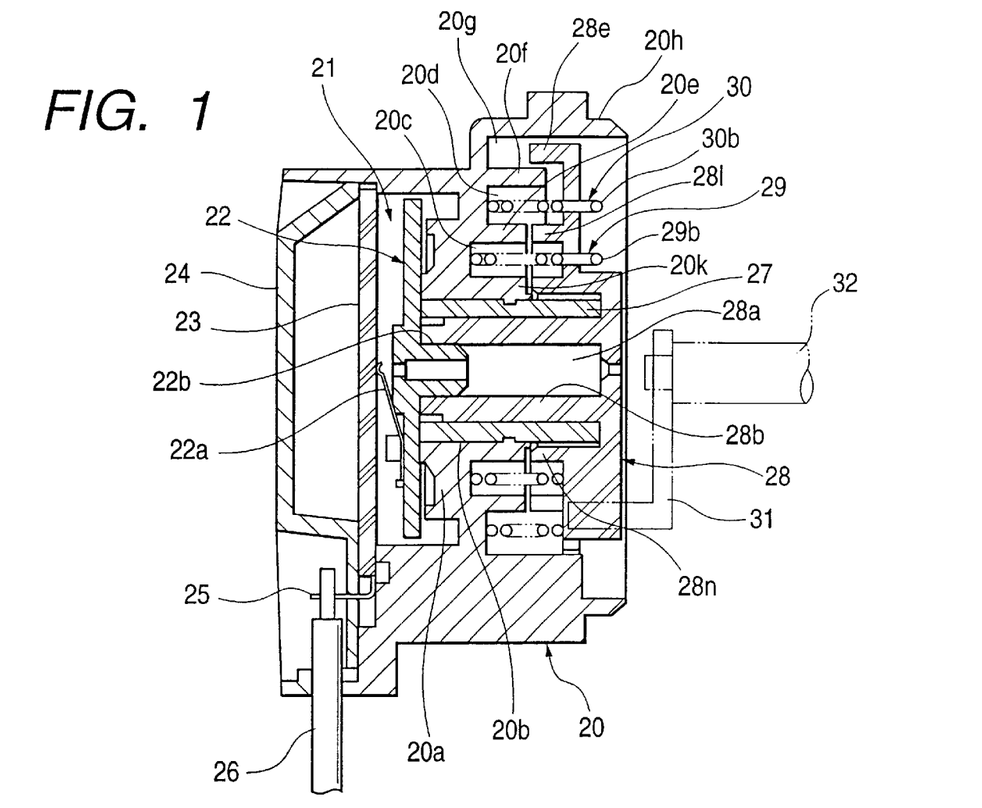
FIG. 1 is a sectional view showing a major portion of a rotary sensor of this invention.
Figure 2:
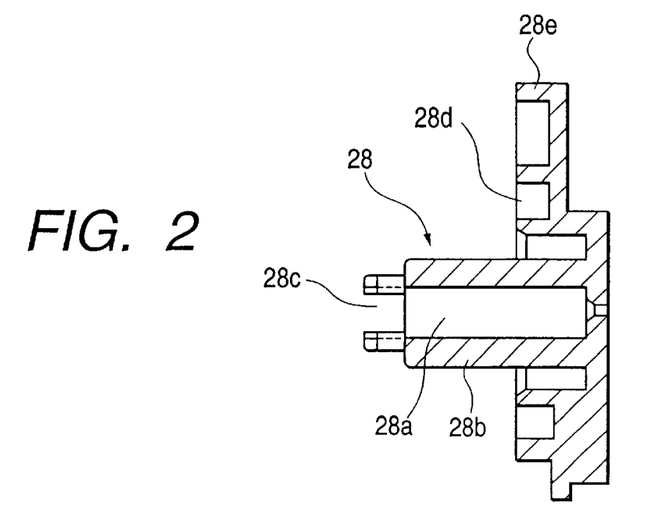
FIG. 2 is a sectional view of a rotator of this invention.
Figure 3:
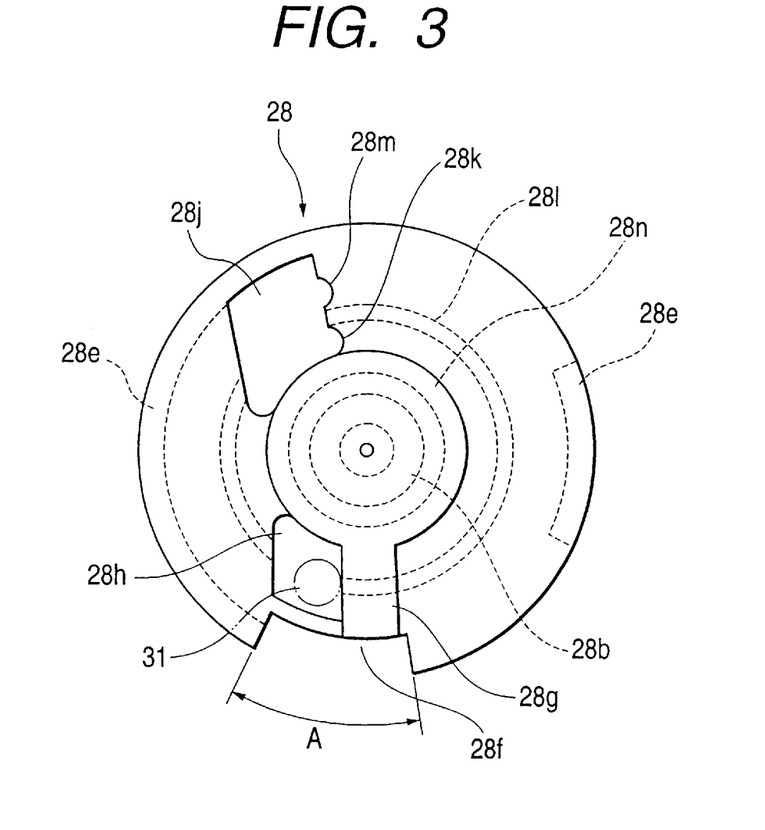
FIG. 3 is a front view of the rotator of this invention.
Figure 4:
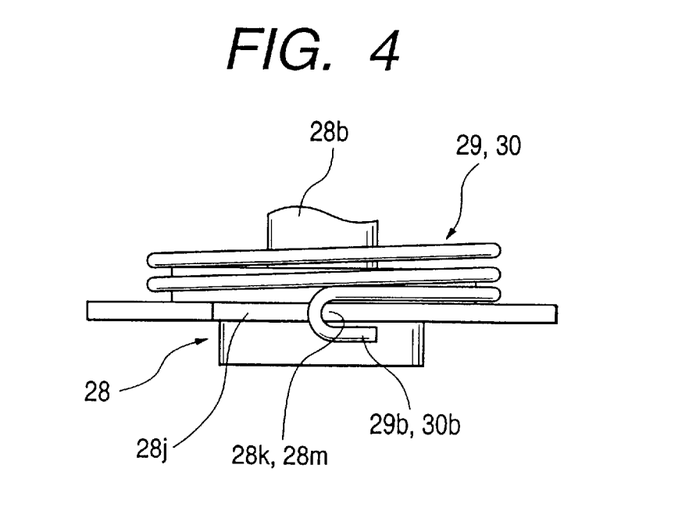
FIG. 4 is a schematic view explaining a relationship between the rotator and a torsion coil spring of this invention.
Figure 5:
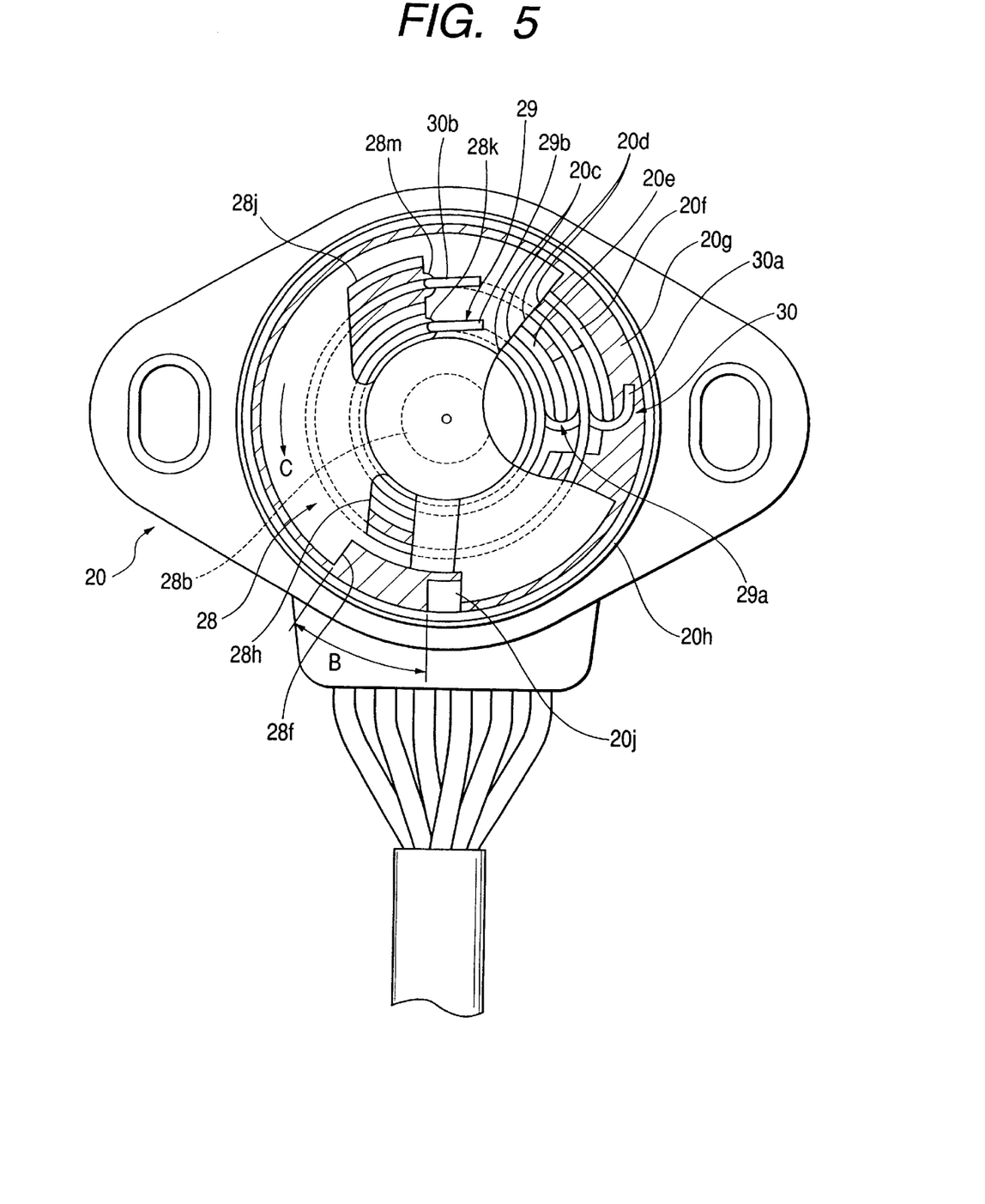
FIG. 5 is a front view of the rotary sensor of this invention.
Figure 6:
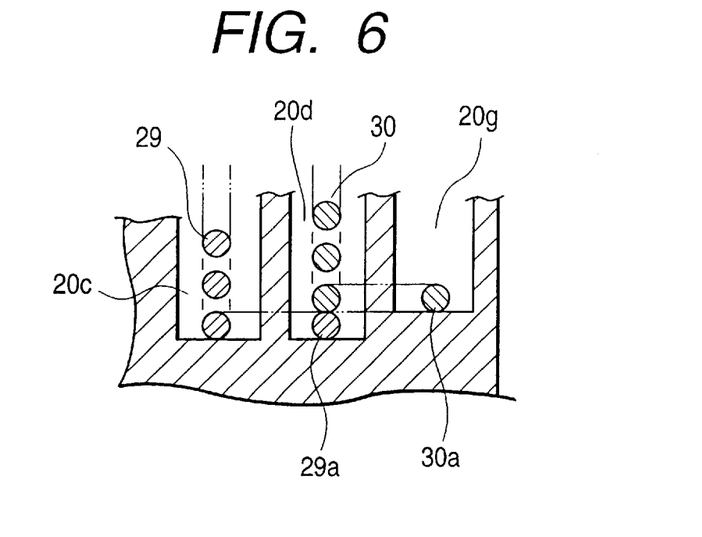
FIG. 6 is a schematic view explaining a relationship between the coil spring and housing of this invention.
Figure 7:
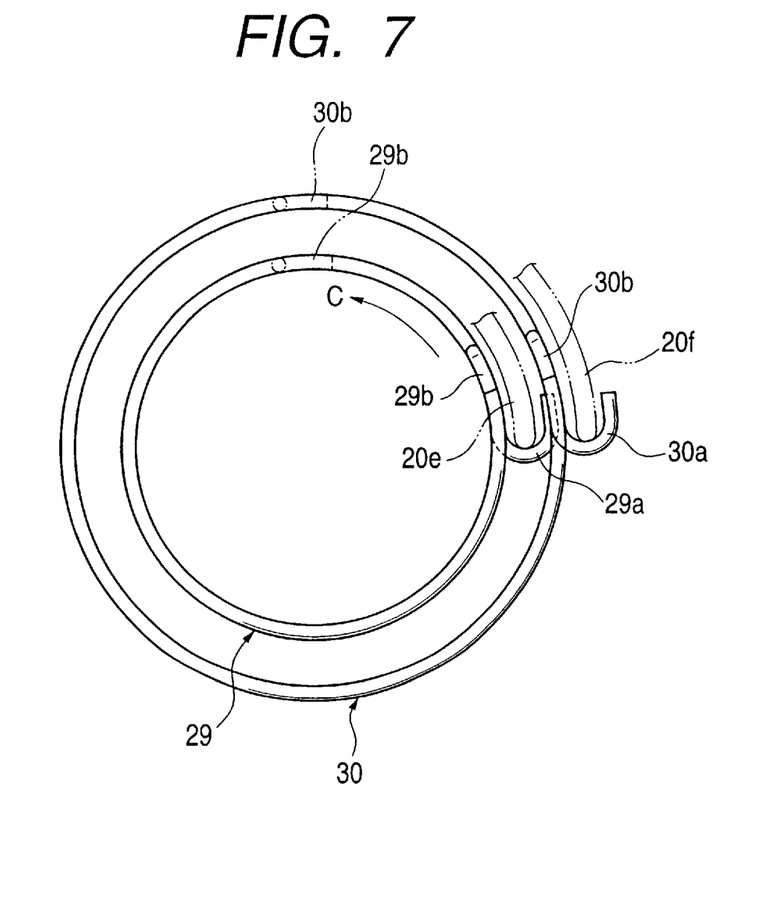
FIG. 7 is a plan view of the torsion coil spring of this invention.

One embodiment of the rotary sensor of this invention will hereinafter be described with reference to the accompanying drawings, in which FIG. 1 is a sectional view of a major portion of the rotary sensor of this invention; FIG. 2 is a sectional view of the rotator of this invention; FIG. 3 is a front view of the rotator of this invention; FIG. 4 is a schematic view explaining a relationship between the rotator and the torsion coil spring of this invention; FIG. 5 is a front view of the rotary sensor of this invention; FIG. 6 is a schematic view explaining a relationship between the torsion coil spring and the housing of this invention; and FIG. 7 is a plan view of the torsion coil spring of this invention.

The rotary sensor of this invention, as shown in FIG. 1 to FIG. 5, has a housing 20 made of a resin material and formed in an approximately cylindrical shape, the interior of which is separated by a partition 20a into one side on the left and the other side on the right as shown in the drawing. On the one side a later-described angle sensing member 21 is installed, while on the other side, a couple of later-described first and second torsion coil springs 29 and 30 are installed.

At the center of the partition 20a there is formed a through hole 20b. In the right side surface of the partition 20a in the drawing, a first and second guide grooves 20c and 20d of specific widths and depths are formed to guide the first and second torsion coil springs 29 and 30; the first guide groove 20c being formed deeper than the second guide groove 20d.

Between the first and second guide grooves 20c and 20d there is formed a first partition wall 20e; and outside of the second guide groove 20d a second partition wall 20f is formed. And on the outside of the second partition wall 20f there is formed a third guide groove 20g of the same depth as the second guide groove 20d.

On the outside of the third guide groove 20g a cylindrical protective wall 20h is formed. On a part of the inside of this protective wall 20h a square stopper 20j as shown in FIG. 5 is formed projecting inwardly.

The angle sensing member 21 mounted on one side in the housing 20 is composed of for instance a variable resistor, in which a slider holder 22 is rotatably mounted on a later-described rotator 28, on the left side of the partition 20a shown in FIG. 1. On the left side surface of the slider holder 22 depicted, a slider piece 22a with a plurality o,f brushes is attached. On the center of rotation of the slider holder 22 on the right side in the drawing, a projection 22b is formed projecting to the right in the drawing.

On the side the slider piece 22a is attached, a resistor board 23 is disposed oppositely to the slider holder 22 with a specific amount of clearance provided therebetween, and is in elastic contact with the slider piece 22a. The outer peripheral edge of the resistor board 23 is positioned and fixedly attached to the inner peripheral wall of the housing 20 with an adhesive.

On the resistor board 23 which the slider piece 22a is in elastic contact with, a resistor pattern not depicted is formed by printing; the resistance value varies with rotation of the slider holder 22.

On the left side, that is on the back side, of resistor board 23 in the drawing, a shield member 24 is attached by an adhesive to shield the interior of the housing 20. On one end of the resistor board 23 a terminal 25 is attached. The end portion of the terminal 25 is formed projecting out to the left side of the shield member 24 as seen in the drawing.

On the end portion of the terminal 25 projecting to the left side from the resistor board 23 as shown, the end portion of the lead wire 26 is soldered. The lead wire 26 is led out downwardly in the drawing.

In the through hole 20b formed in the central part of the partition 20a, a cylindrical bearing 27 is mounted by pressing and locked from displacement.

On the right side of the partition 20a in the drawing, an approximately disk-like rotator 28 is disposed as shown in FIGS. 2 and 3; at the center of rotation of this rotator 28, a rotating shaft 28b having a press-in hole 28 a of a specific depth is projectively formed.

The rotating shaft 28b is inserted over the bearing 27 which is pressed in the partition 20a. In the press-in hole 28a in the forward end of the rotating shaft 28b, the projection 22b of the slider holder 22 is locked for instance by pressing. The rotator 28 and the slider holder 22 are assembled as one body and rotatably attached to the partition 20a.

The projection 22b is so designed as to engage with a slot 28c formed in the forward end of the rotating shaft 28b, so that the slider holder 22 will be locked for preventing from turning with respect to the rotator 28.

In the rotator 28 a guide groove 28d is formed on the opposite side of the first guide groove 20c of the partition 20a. And in a part of the outer peripheral end of the rotator 28 a protective wall 28e of specific width and height is formed circumferentially.

Furthermore, a cutout 28f of a specific width is formed at the angle A in a part of the outer periphery of the rotator 28 as shown in FIG. 3. And a square projecting portion 28g of specific width and depth is projectively formed in contact with the bottom of the cutout 28f.

On the left side of the projecting portion 28g in the drawing, an approximately square through window 28h is formed. In the through window 28h an arm member 31 indicated by a two-dot chain line described later is positioned. In the left upper part of the rotator 28 shown in FIG. 3 a spring retaining window 28j is formed. In one end face of the spring retaining window 28j, a first retaining slot 28k and a second retaining slot 28m are engraved in an approximately semicircular form, so that retaining portions 29b and 30b on the other ends of the first and second torsion coil springs 29 and 30 described later will be retained.

The rotator 28 which is formed integrally with the slider holder 22 is rotatable within a range of the angle B (about 30 deg.) with the end face of the cutout 28f in contact with the stopper 20j of the housing 20 as shown in FIG. 5.

In the first and second guide grooves 20c and 20d of the housing 20, the first and second torsion coil springs 29 and 30 are housed respectively. The ends of the first and second torsion coil springs 29 and 30 are bent outwardly to form hooked retaining portions 29a and 30a which are orthogonal to the direction of winding of the coil springs as shown in FIG. 7.

The first and second torsion coil springs 29 and 30 are bent upright on the other end in relation to the surface of the drawing sheet, in a direction orthogonal to the retaining portions 29a and 30a at one end shown in FIG. 7, thus forming hooked retaining portions 29b and 30b as shown in FIG. 4.

The retaining portions 29a and 30a at one end are retained on the end of the first and second partition walls 20e and 20f of the housing 20 as shown in FIG. 5. The retaining portions 29b and 30b on the other end are retained to the first and second retaining slots 28k and 28m of the spring retaining window 28j of the rotator 20 as shown in FIG. 4.

That is, the rotating shaft 28b formed on the center of rotation of the rotator 28 is rotatably supported on a bearing 27 pressed and locked in the housing 20; and as shown in FIG. 5, the first torsion coil spring 29 is mounted, surrounding the rotating shaft 28b. On the outside of the first torsion coil spring 29, the second torsion coil spring 30 is mounted, surrounding the first torsion coil spring 29. The first and second torsion coil springs 29 and 30 are interposed between the rotator 28 and the housing 20.

The first and second torsion coil springs 29 and 30 are retained on the end portions of the first and second partition walls 20e and 20f each of which is a part of the housing, and also the retaining portions 29b and 30b formed on the other end are retained in the first and second retaining slots 28k and 28m each of which is a part of the rotator 28. As shown in FIG. 6, the retaining portion 30a at one end of the second torsion coil spring 30 is superposed on the retaining portion 29a at one end of the first torsion coil spring 29, thereby preventing the retaining portion 29a at one end of the first torsion coil spring 29 from coming off the end of the first partition wall 20e.

The first and second torsion coil springs 29 and 30 are housed in the first and second guide grooves formed in the housing 20. The first guide groove 20c is formed deeper than the second guide groove 20d by the same amount as the wire diameter of the first torsion coil spring 29. And the second guide groove 20d in which the retaining portions 29a and 30a at one end of the first and second torsion coil springs 29 and 30 are overlapped is made equal in depth to the first guide groove 20c.

That is, as shown in FIG. 5, the bottom surface of the first guide groove 20c is indicated in the color of black, while the bottom surface of the second guide groove 20d is indicated with a grid pattern. The second guide groove 20d, in which the retaining portions 29a and 30a formed at one end of the first and second torsion coil springs 29 and 30 in the vicinity of the first and second partition walls 20e and 20f are overlapped, is indicated black and is formed to the same depth as the first guide groove 20c. Furthermore, the third guide groove 20g is formed to the same depth as the second guide groove 20d.

In the rotary sensor of this invention, the first and second torsion coil springs 29 and 30 turn the rotator 28 counterclockwise in the direction of the arrow C to position the cutout 28f at the stopper 20j of the housing 20, with the retaining portions 29a and 30a at one end retained on the first and second partition walls 20e and 20f and with the retaining portions 29b and 30b on the other end retained in the first and second retaining slots 28k and 28m of the rotator 28; therefore the spring force is constantly exerted to the rotator unidirectionally to turn clockwise with respect to the housing 20.

Next, the rotary sensor of this invention used as an accelerator position sensor of an automobile will be explained. First, in the rotator 28 the first and second torsion coil springs 20 and 30 are assembled in a compressed state. The rotator 28, therefore, is constantly applied with the spring force to turn clockwise. When the rotary sensor is alone off the automobile, the end face of the cutout 28f is in contact with the stopper 20j.

Then, the rotary sensor is mounted to the automobile in this state, or with the arm member 31 held in contact with the side surface of the projection 28g, in which the rotator 28 has been turned a little in the counterclockwise direction.

The arm member 31 is attached at the other approximately L-shaped end to a drive shaft to be detected as shown by a two-dot chain line in FIG. 1. With the counterclockwise rotation of the drive shaft 32, the rotator 28 also turns clockwise in the direction of the arrow C. Then, as the drive shaft 32 rotates clockwise, the rotator 28 is also turned by the first and second torsion coil springs 29 and 30. Thus the rotator 28 is designed to rotate together with the drive shaft 32 within the range of the rotation angle B shown in FIG. 5, changing the resistance value according to the position of rotation. The change in the resistance value is detected to see the rotation angle of the drive shaft 32.

With the counterclockwise rotation of the rotator 28, the first and second torsion coil springs 29 and 30 are deflected, decreasing in coil diametermostly in the vicinity of both ends. The retaining members located inside, and retaining, the torsion coil springs 29 and 30 are provided with projecting portions such as the projection 20k, second partition wall 20e, and projections 28n and 28l; the torsion coil springs 29 and 30, being blocked with these projecting portions, can smoothly rotate the rotator without unnecessary friction.

These torsion coil springs 29 and 30, arranged in the guide grooves 20c and 20d and grooves in the rotator 28, have little risk such as accidental dislocation of the springs and are free from large deformation if applied with an impact from outside.

Furthermore, since the retaining portion 30a at one end of the second torsion coil spring 30 is superposed on the retaining portion 29a at one end of the first torsion coil spring 29 as stated above, the springs will never come off by the spring retaining window 28j.

To firmly hold the retaining portion 30a formed at one end of the second torsion coil spring 30, the second partition wall 20f is formed sufficiently high as compared with the overall height of the second torsion coil spring 30 and besides a protective wall 28e is provided on the outside. Therefore, the spring will never come off if a vertical impact is applied in the direction in which the spring is working.

Furthermore, the other ends of the torsion coil springs 29 and 30 are bent 90 deg. as described above and retained in the first and second retaining slots 28k and 28m; therefore the torsion coil springs 29 and 30 will never come out of the first and second retaining slots 28k and 28m if an impact is applied in the direction of load application and in a vertical direction. Also, the torsion coil springs 29 and 30 will never come off even when loaded in the direction of spring force application.

To assemble the rotary sensor of this invention, first the first and second torsion coil springs 29 and 30 are inserted into the first and second guide grooves 20c and 20d formed in the housing 20.

Next, the rotating shaft 28b or the rotator 28 is inserted over the bearing 27 pressed into the housing 20. Thereafter, while turning the rotator 28, the retaining portions 29b and 30b at the other ends of the first and second torsion coil springs 29 and 30 are retained by hooking in the fir stand second retaining slots 28k and 28m of the spring retaining window 28j.

Then, the rotator 28 is turned counterclockwise in the direction of the arrow C until the stopper portion 20j of the housing 20 is positioned in the cutout 28f. Thus all the disk-like rotator 28 is positioned in the protective wall 20h and accordingly rotatably held in the housing 20 within the range of the rotation angle B.

Next, the slider holder 22 fitted with the slider piece 22a is pressed, or installed and locked by thermal caulking, in the press-in hole 28a in the forward end of the rotating shaft 28b of the rotator 28, and then the slider holder 22 and the rotator 28 are rotatably mounted as one body in the housing 20.

Next, the resistor board 23 is attached in the housing 20, and the shield member 24 is bonded on the back side of the resistor board 23. Subsequently, the lead wire 26 is attached by soldering to the end of the terminal 25 projecting out of the shield member 24, thus completing the assembling of the rotator sensor of this invention.

In the above-described embodiment of this invention, two coil springs, that is, the first and second torsion coil springs 29 and 30, are employed. However, the number of the torsion coil springs may be at least two or more, for example three. In this invention, the retaining portion 30a formed at one end of the second torsion coil spring 30 is superposed on the retaining portion 29a formed at one end of the first torsion coil spring 29; however, the first coil, opposite to the housing 20, of the second torsion coil spring 30 may be superposed at any part on the retaining portion 29a formed at one end of the first torsion coil spring 29.

It is also to be noticed that in another embodiment of this invention, though not illustrated, the retaining portions 29a and 30a at one ends of the first and second torsion coil springs 29 and 30 may be bent inwardly and the retaining portion 29a formed at one end of the first coil spring 29 may be superimposed on the retaining portion 30a formed at one end of the second torsion coil spring 30.

In this case, as regards the depth of the first and second guide grooves 20c and 20d, the second guide groove 20d must be formed deeper than the first guide groove 20c.

In the rotary sensor of this invention, at least two torsion coil springs, that is, the first and second torsion coil springs constantly acting to turn the rotator in one direction with respect to the housing are disposed between the rotator and the housing. Therefore if one of the torsion coil springs has failed due to metal fatigue or other during operation, the other torsion coil spring can temporarily operate the rotator. Accordingly, operation may be continued without immediately stopping.

Also it is possible to provide a rotary sensor which can achieve a relatively uniform elastic force at any angle of rotation, and can be decreased in thickness.

Furthermore, the rotating shaft formed on the center of rotation of the rotator is rotatably supported on the housing; the first torsion coil spring is mounted, surrounding the rotating shaft; and the second torsion coil spring is disposed outside the first torsion coil spring, surrounding the first torsion coil spring. Therefore, the elastic force of the first and second torsion coil springs in the direction of rotation can be applied directly to the rotator, and a desired amount of elastic force can be applied to the rotator without increasing the height of the spring.

Furthermore, because the second torsion coil spring is juxtaposed on the outside of the first torsion coil spring, it is possible to increase the elastic force to be applied to the rotator in the direction of rotation and also to decrease the spring constant of the first and second torsion coil springs separately.

Furthermore, the first and second torsion coil springs are retained by hooking the retaining portion formed at one end to a part of the housing and also the retaining portion formed on the other end to a part of the rotator; also the retaining portion formed at one end of the second torsion coil spring is superposed on the retaining portion formed at one end of the first torsion coil spring; and therefore it is unlikely that the one end of the first torsion coil spring will come off from the retaining position on the housing side. The first torsion coil spring can be reliably retained on the housing.

Therefore, the first torsion coil spring, if small in the shape of the retaining portion formed at one end, can be firmly retained. The first torsion coil spring can be made simple in shape and the material of this spring can be reduced.

Furthermore, the first and second torsion coil springs are arranged in the first and second guide grooves of a specific depth formed in the housing; the first guide groove is made deeper by the same amount as the wire diameter of the first torsion coil spring than the second guide groove; and the depth of the second guide groove is made equal to that of the first guide groove, in the part where the retaining portions at one ends of the first and second torsion coils are overlapped. Therefore, one end of the first torsion coil spring can reliably be secured in position by the second torsion coil spring.

What is claimed is:

1. A rotary sensor, comprising:

a rotator to transmit rotation from outside;

a housing to rotatably support said rotator;

an angle sensing member to detect an angle of rotation of said rotator; and at least a first and second torsion coil spring disposed between said rotator and said housing, wherein the first and second torsion coil spring constantly turn said rotator in one direction towards said housing;

a rotation shaft formed on a center of rotation of said rotator is rotatably supported on said housing;

said first torsion coil spring is disposed to surround said rotating shaft;

said second coil spring is disposed outside of said first torsion coil spring to surround said first torsion coil spring;

said first and second torsion coil springs are retained by retaining a first retaining portion formed at one end of each of the first and second torsion coil springs to a part of said housing, and a second retaining portion formed at the other end of each of said first and second torsion coil springs to a part of said rotator; and said first retaining portion on said one end of said second torsion coil spring is superposed on said first retaining portion at said one end of said first torsion coil spring.

2. A rotary sensor according to claim 1, wherein said first and second torsion coil springs are disposed in first and second guide grooves of a specific depth formed in said housing; said first guide groove being formed deeper by the wire diameter of said first torsion coil spring than said second guide groove; and the depth of said second guide groove being made equal to the depth of said first guide groove in said superposed retaining portions at the one end of said first and second torsion coil springs.

3. A rotary sensor according to claim 1, further comprising:

a first guide groove to guide the first torsion coil spring, the first guide groove having a first depth; and a second guide groove to guide the second torsion coil spring, the second guide groove having a second depth, wherein the first depth and the second depth are equal.

4. A rotary sensor according to claim 1, wherein the first and second torsion coil springs abut against each other.

5. A rotary sensor according to claim 1, wherein the first and second torsion coil springs are separated from each other.

6. A rotary sensor, comprising:

a rotator to transmit rotation from outside, the rotator having a center of rotation and a rotation shaft formed on the center of rotation of said rotator;

a housing to rotatably support said rotator and having a protrusion, the rotation shaft rotatably supported on said housing;

an angle sensing member to detect an angle of rotation of said rotator; and a first and second torsion coil spring disposed between said rotator and said housing, each of the first and second torsion coil spring having a wound part, one end of each of the first and second torsion coil springs to form a first retaining portion, the other end of each of the first and second torsion coil springs to form a second retaining portion, the first and second torsion coil springs being retained by retaining the first retaining portion of the first and second torsion coil springs to a part of the housing and the second retaining portion of the first and second torsion coil springs to a part of the rotator, and the first retaining portion of the first torsion coil spring being bent into a hook shape to protrude out of said wound part of the first torsion coil spring, wherein the first and second torsion coil spring constantly turn said rotator in one direction towards said housing, said first torsion coil spring surrounds said rotating shaft, said second coil spring is disposed outside of said first torsion coil spring to surround said first torsion coil spring, the hook shaped first retaining portion is engaged with said housing by being hooked to the protrusion of the housing, and the wound part of the second torsion coil spring is superposed on the first retaining portion of the first torsion coil spring.

7. A rotary sensor according to claim 6, further comprising:

a first guide groove to guide the first torsion coil spring, the first guide groove having a first depth; and a second guide groove to guide the second torsion coil spring, the second guide groove having a second depth, wherein the first depth and the second depth are equal.

8. A rotary sensor according to claim 6, wherein the first and second torsion coil springs abut against each other.

9. A rotary sensor according to claim 6, wherein the first and second torsion coil springs are separated from each other.

10. A rotary sensor according to claim 6, wherein one of the first and second retaining portions of the first torsion coil spring is positioned on the one of the first and second retaining portions of the second torsion coil spring.

11. A rotary sensor, comprising:

a rotator to transmit rotation from outside;

a housing to rotatably support said rotator;

an angle sensing member to detect an angle of rotation of said rotator; and at least a first and second torsion coil spring disposed between said rotator and said housing, wherein the first and second torsion coil spring constantly turn said rotator in one direction towards said housing;

a rotation shaft formed on a center of rotation of said rotator is rotatably supported on said housing;

said first torsion coil spring is disposed to surround said rotating shaft;

said second coil spring is disposed outside of said first torsion coil spring to surround said first torsion coil spring;

said first and second torsion coil springs are retained by retaining a first retaining portion formed at one end of each of the first and second torsion coil springs to a part of said housing, and a second retaining portion formed at the other end of each of said first and second torsion coil springs to a part of said rotator; and said first retaining portion on said one end of said first torsion coil spring is superposed on said first retaining portion at said one end of said second torsion coil spring.

12. A rotary sensor according to claim 11, further comprising:

a first guide groove to guide the first torsion coil spring, the first guide groove having a first depth; and a second guide groove to guide the second torsion coil spring, the second guide groove having a second depth, wherein the first depth and the second depth are equal.

13. A rotary sensor according to claim 11, wherein the first and second torsion coil springs abut against each other.

14. A rotary sensor according to claim 11, wherein the first and second torsion coil springs are separated from each other.

* * * * *